(12) United States Patent
Okabe

(10) Patent No.: US 10,763,530 B2
(45) Date of Patent: Sep. 1, 2020

(54) MANUFACTURING METHOD FOR FUEL CELL

(71) Applicant: TOYOTA JIDOSHA KABUSHIKI KAISHA, Toyota-shi, Aichi-ken (JP)

(72) Inventor: Hiroki Okabe, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 108 days.

(21) Appl. No.: 15/797,526

(22) Filed: Oct. 30, 2017

(65) Prior Publication Data
US 2018/0159160 A1   Jun. 7, 2018

(30) Foreign Application Priority Data
Dec. 1, 2016 (JP) .................. 2016-234472

(51) Int. Cl.
| | |
|---|---|
| *H01M 8/1004* | (2016.01) |
| *H01M 8/0202* | (2016.01) |
| *H01M 8/0273* | (2016.01) |
| *H01M 8/2418* | (2016.01) |
| *H01M 8/0247* | (2016.01) |

(52) U.S. Cl.
CPC ....... *H01M 8/1004* (2013.01); *H01M 8/0202* (2013.01); *H01M 8/0247* (2013.01); *H01M 8/0273* (2013.01); *H01M 8/2418* (2016.02); *Y02P 70/56* (2015.11)

(58) Field of Classification Search
CPC ............. H01M 8/1004; H01M 8/2418; H01M 8/0247; H01M 8/0273; H01M 8/0202; Y02P 70/56
See application file for complete search history.

(56) References Cited

U.S. PATENT DOCUMENTS

| | | | | |
|---|---|---|---|---|
| 2004/0028983 A1* | 2/2004 | Hayashi | ............. | H01M 8/0271 429/510 |
| 2006/0110651 A1* | 5/2006 | Wakahoi | ............. | H01M 8/0263 429/483 |
| 2009/0004539 A1* | 1/2009 | Ishikawa | ............. | H01M 8/0273 429/434 |

(Continued)

FOREIGN PATENT DOCUMENTS

| | | |
|---|---|---|
| JP | 2007-324122 A | 12/2007 |
| JP | 2008-293896 A | 12/2008 |

(Continued)

OTHER PUBLICATIONS

U.S. Appl. No. 15/837,687, filed Dec. 11, 2017, 26 pages.

*Primary Examiner* — Michael L Dignan
(74) *Attorney, Agent, or Firm* — Hunton Andrews Kurth LLP

(57) ABSTRACT

A manufacturing method for a fuel cell includes: preparing a membrane electrode gas diffusion layer assembly; preparing a support frame having an electrical insulating property and an ultraviolet permeability; preparing a separator; bonding the membrane electrode gas diffusion layer assembly and the support frame to each other via a first ultraviolet curable adhesive; and, after the membrane electrode gas diffusion layer assembly and the support frame are bonded to each other, bonding the support frame and the separator to each other via a second ultraviolet curable adhesive.

8 Claims, 10 Drawing Sheets

(56) References Cited

U.S. PATENT DOCUMENTS

| | | | |
|---|---|---|---|
| 2009/0075134 A1* | 3/2009 | Tanaka | H01M 8/0206 429/434 |
| 2010/0216048 A1* | 8/2010 | Braeuninger | H01M 4/881 429/483 |
| 2012/0178011 A1* | 7/2012 | Sugiura | H01M 8/0273 429/457 |
| 2014/0004442 A1* | 1/2014 | Mitsuta | H01M 8/1004 429/481 |
| 2016/0285119 A1* | 9/2016 | Hayashi | H01M 8/1004 |
| 2016/0293976 A1* | 10/2016 | Kanai | H01M 8/1004 |
| 2018/0178441 A1* | 6/2018 | Yoshida | F16J 15/102 |

FOREIGN PATENT DOCUMENTS

| | | | |
|---|---|---|---|
| JP | 2010-212001 A | 9/2010 | |
| JP | 2015-115131 | * 11/2015 | H01M 8/02 |
| JP | 2016-162650 A | 9/2016 | |

* cited by examiner

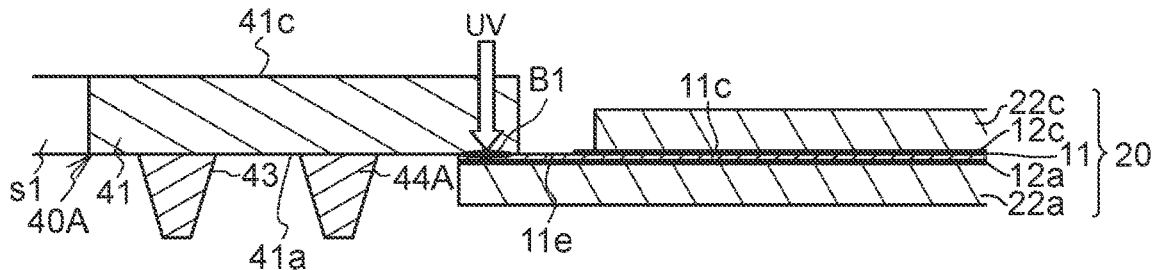
FIG. 8A
FIG. 8B
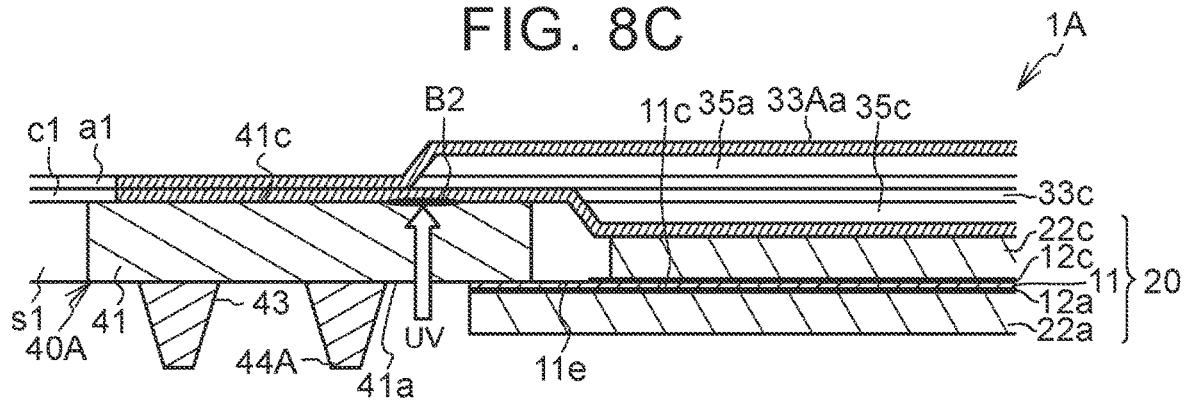
FIG. 8C
FIG. 8D
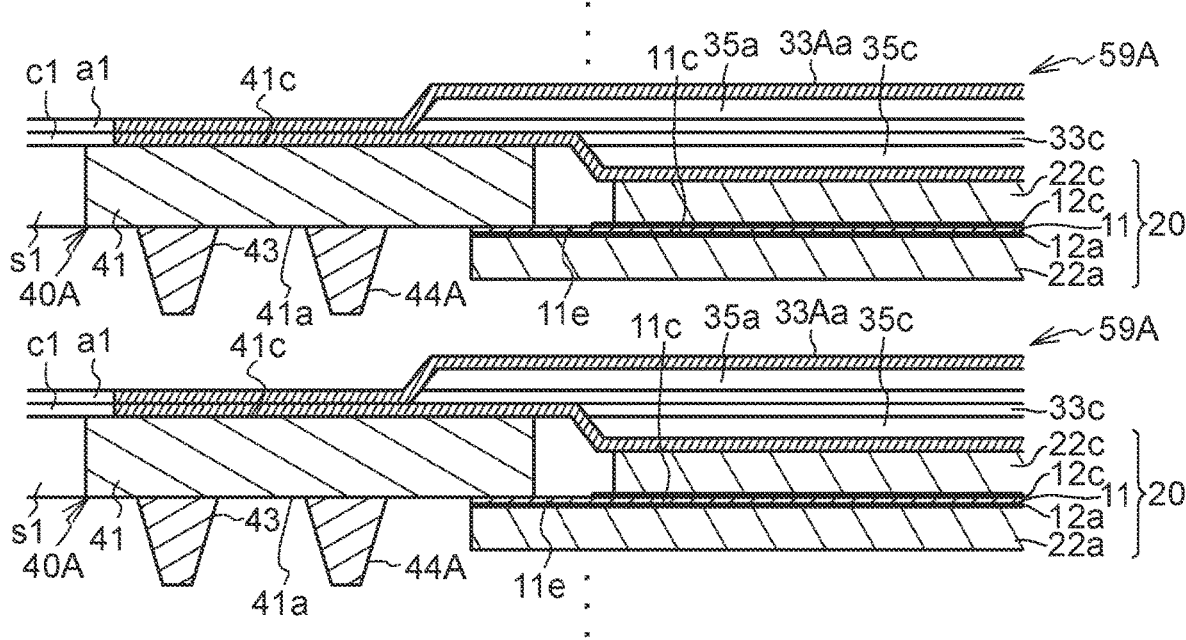

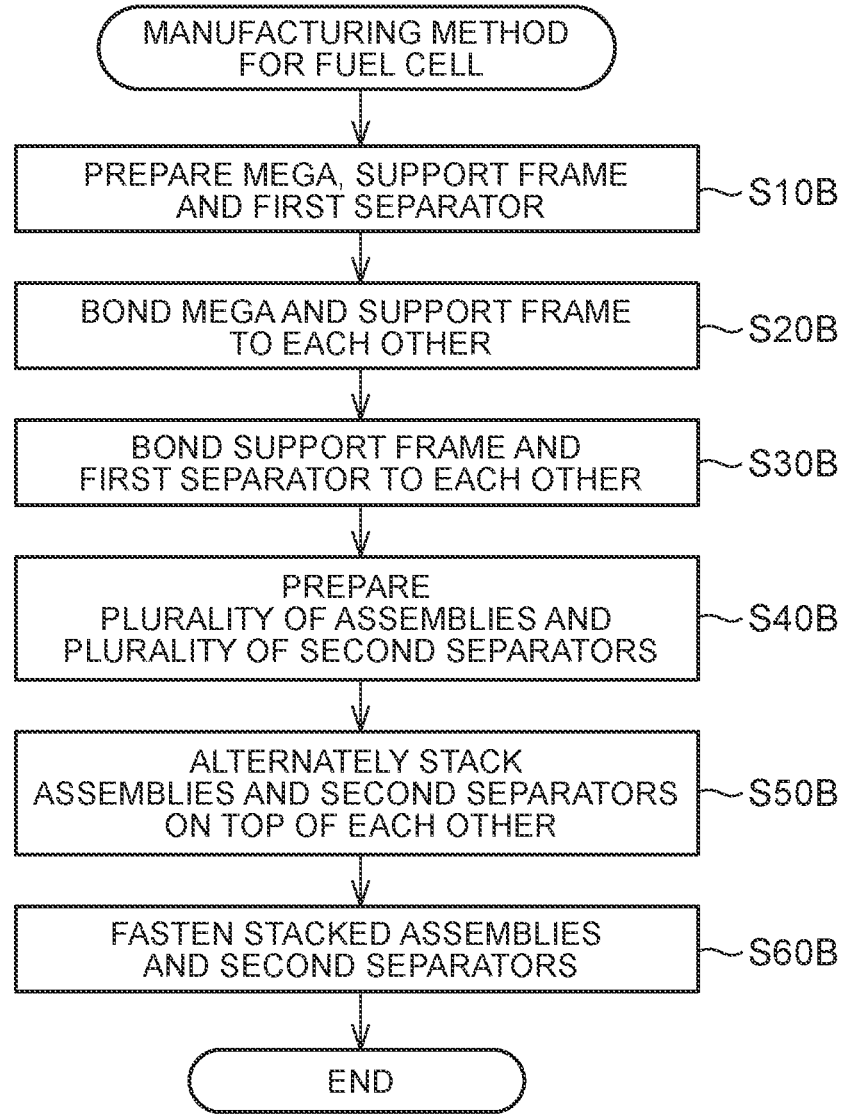

MANUFACTURING METHOD FOR FUEL CELL

INCORPORATION BY REFERENCE

The disclosure of Japanese Patent Application No. 2016-234472 filed on Dec. 1, 2016 including the specification, drawings and abstract is incorporated herein by reference in its entirety.

BACKGROUND

1. Technical Field

The disclosure relates to a manufacturing method for a fuel cell.

2. Description of Related Art

There is known a single cell of a fuel cell. The single cell includes a membrane electrode gas diffusion layer assembly, a support frame and a pair of separators. The support frame supports the membrane electrode gas diffusion layer assembly. The pair of separators sandwich the membrane electrode gas diffusion layer assembly and the support frame. For example, in Japanese Patent Application Publication No. 2016-162650 (JP 2016-162650 A), a peripheral region of a membrane electrode gas diffusion layer assembly, at which an electrolyte membrane is exposed, is bonded to a support frame by an ultraviolet curable adhesive, and separators and the support frame are bonded to each other by a thermoplastic adhesive.

SUMMARY

Each separator and the support frame are brought into contact with each other via a thermoplastic adhesive. The thermoplastic adhesive is melted by heating portions around these members with a heater, or the like. After that, the thermoplastic adhesive is cured by cooling these members. Thus, these members are bonded to each other. In this way, since the portions around the separators and the support frame need to be heated until the thermoplastic adhesive melts, and then these members need to be cooled until the thermoplastic adhesive is cured, a manufacturing time may extend. In addition, it is not possible to heat only the thermoplastic adhesive, and the portions around the separators and the support frame need to be heated to such an extent that the thermoplastic adhesive melts in anticipation of an escape of heat to part of the separators and support frame. For this reason, an energy loss resulting from heating increases, and it may not be possible to suppress an increase in manufacturing cost.

The disclosure provides a manufacturing method for a fuel cell, which suppresses an extension of manufacturing time and an increase in manufacturing cost.

A first aspect of the disclosure provides a manufacturing method for a fuel cell. The manufacturing method includes: preparing a membrane electrode gas diffusion layer assembly in which a catalyst layer and a gas diffusion layer are formed on each face of an electrolyte membrane such that a peripheral region of one of the faces of the electrolyte membrane is exposed; preparing a frame-shaped support frame having an electrical insulating property and an ultraviolet permeability, the support frame being larger in outer peripheral shape than the electrolyte membrane, the support frame being smaller in inner peripheral shape than the electrolyte membrane; preparing a first separator that is larger in outer peripheral shape than the membrane electrode gas diffusion layer assembly; bonding the membrane electrode gas diffusion layer assembly and the support frame to each other by bringing the peripheral region of the electrolyte membrane and an inner peripheral side of a first face of the support frame into contact with each other via a first ultraviolet curable adhesive and then irradiating ultraviolet light to the first ultraviolet curable adhesive from a second face of the support frame across from the first face; after the membrane electrode gas diffusion layer assembly and the support frame are bonded to each other, bonding the support frame and the first separator to each other by bringing the second face of the support frame and the first separator into contact with each other via a second ultraviolet curable adhesive located outside an outer periphery of the membrane electrode gas diffusion layer assembly and then irradiating ultraviolet light to the second ultraviolet curable adhesive from the first face of the support frame at a portion outside the outer periphery of the membrane electrode gas diffusion layer assembly; preparing a plurality of assemblies in which the support frame, the membrane electrode gas diffusion layer assembly and the first separator are bonded to each other; preparing a second separator that is larger in outer peripheral shape than the membrane electrode gas diffusion layer assembly; and alternately stacking the plurality of assemblies and a plurality of the second separators on top of each other such that each second separator is arranged on the first face of the support frame of a corresponding one of the assemblies.

Since the support frame has an ultraviolet permeability, it is possible to easily irradiate ultraviolet light to the first and second ultraviolet curable adhesives by allowing ultraviolet light to pass through the support frame. After the membrane electrode gas diffusion layer assembly and the support frame are bonded to each other and before the second separator is arranged on the first face of the support frame, ultraviolet light is irradiated to the second ultraviolet curable adhesive from the first face of the support frame. Thus, it is possible to bond the support frame and the first separator to each other without interference of the second separator. Since the ultraviolet curable adhesives that are used for bonding in this way are cured when ultraviolet light is irradiated to the ultraviolet curable adhesives, a long time from heating to curing as in the case of a thermoplastic adhesive is not required, so an extension of manufacturing time is suppressed. Since it is not required to heat part of the support frame or separator, an energy loss is suppressed, so an increase in manufacturing cost is suppressed.

A second aspect of the disclosure provides a manufacturing method for a fuel cell. The manufacturing method includes: preparing a membrane electrode gas diffusion layer assembly in which a catalyst layer and a gas diffusion layer are formed on each face of an electrolyte membrane such that a peripheral region of one of the faces of the electrolyte membrane is exposed; preparing a frame-shaped support frame having an electrical insulating property and an ultraviolet permeability, the support frame being larger in outer peripheral shape than the electrolyte membrane, the support frame being smaller in inner peripheral shape than the electrolyte membrane; preparing first and second separators that are larger in outer peripheral shape than the membrane electrode gas diffusion layer assembly; bonding the membrane electrode gas diffusion layer assembly and the support frame to each other by bringing the peripheral region of the electrolyte membrane and an inner peripheral side of a first face of the support frame into contact with each other via a first ultraviolet curable adhesive and then irradiating ultraviolet light to the first ultraviolet curable adhesive from a second face of the support frame across from the first face; bonding the first and second separators to each other; after the membrane electrode gas diffusion layer assembly and the support frame are bonded to each other and after the first and second separators are bonded to each other, bonding the support frame and the first separator to each other by bringing the second face of the support frame and the first separator into contact with each other via a second ultraviolet curable adhesive located outside an outer periphery of the membrane electrode gas diffusion layer assembly and then irradiating ultraviolet light to the second ultraviolet curable adhesive from the first face of the support frame at a portion outside the outer periphery of the membrane electrode gas diffusion layer assembly; preparing a plurality of assemblies in which the support frame, the membrane electrode gas diffusion layer assembly and the first and second separators are bonded to each other; and stacking the plurality of assemblies in the same orientation.

Since the support frame has an ultraviolet permeability, it is possible to easily irradiate ultraviolet light to the first and second ultraviolet curable adhesives by allowing ultraviolet light to pass through the support frame. After the membrane electrode gas diffusion layer assembly and the support frame are bonded to each other and after the first and second separators are bonded to each other, ultraviolet light is irradiated from the first face of the support frame to the second ultraviolet curable adhesive. Thus, it is possible to bond the support frame and the first separator, to which the second separator has been bonded, to each other without interference of the second separator. Since the ultraviolet curable adhesives that are used for bonding in this way are cured when ultraviolet light is irradiated to the ultraviolet curable adhesives, a long time from heating to curing as in the case of a thermoplastic adhesive is not required, so an extension of manufacturing time is suppressed. Since it is not required to heat part of the support frame or separator, an energy loss is suppressed, so an increase in manufacturing cost is suppressed.

In the above configuration, the support frame may have a hole and elastic first and second protrusions, reactant gas or refrigerant may flow through the hole, the first and second protrusions may be formed on the first face such that the first protrusion surrounds the hole and the second protrusion surrounds the membrane electrode gas diffusion layer assembly, the first separator may have a communication hole that communicates with the hole, the second separator may be smaller in outer peripheral shape than the first separator, the second separator may have no communication hole that communicates with the hole, and, in alternately stacking the plurality of assemblies and the plurality of second separators, the first protrusion may be compressed by the first separator, and the second protrusion may be compressed by the second separator.

In the above configuration, the support frame may have a hole and elastic first and second protrusions, reactant gas or refrigerant may flow through the hole, the first and second protrusions may be formed on the first face such that the first protrusion surrounds the hole and the second protrusion surrounds the membrane electrode gas diffusion layer assembly, and, in stacking the plurality of assemblies in the same orientation, the first and second protrusions may be compressed by the second separator.

In the above configuration, a material of the support frame may include at least one of a polyethylene naphthalate resin, a polyethylene terephthalate resin, a polyether sulphone resin, a polyphenylene sulfide resin and a polypropylene resin.

In the above configuration, a material of at least one of the first and second protrusions may be a thermoplastic elastomer, and the at least one of the first and second protrusions may be formed integrally with the support frame.

It is possible to provide a manufacturing method for a fuel cell, which suppresses an extension of manufacturing time and an increase in manufacturing cost.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8A is a view that illustrates the manufacturing method for the fuel cell according to the alternative embodiment;

FIG. 8B is a view that illustrates the manufacturing method for the fuel cell according to the alternative embodiment;

FIG. 8C is a view that illustrates the manufacturing method for the fuel cell according to the alternative embodiment;

FIG. 8D is a view that illustrates the manufacturing method for the fuel cell according to the alternative embodiment;

FIG. 9 is a flowchart that shows a manufacturing method according to an alternative embodiment for a fuel cell;

DETAILED DESCRIPTION OF EMBODIMENTS

Figure 1:
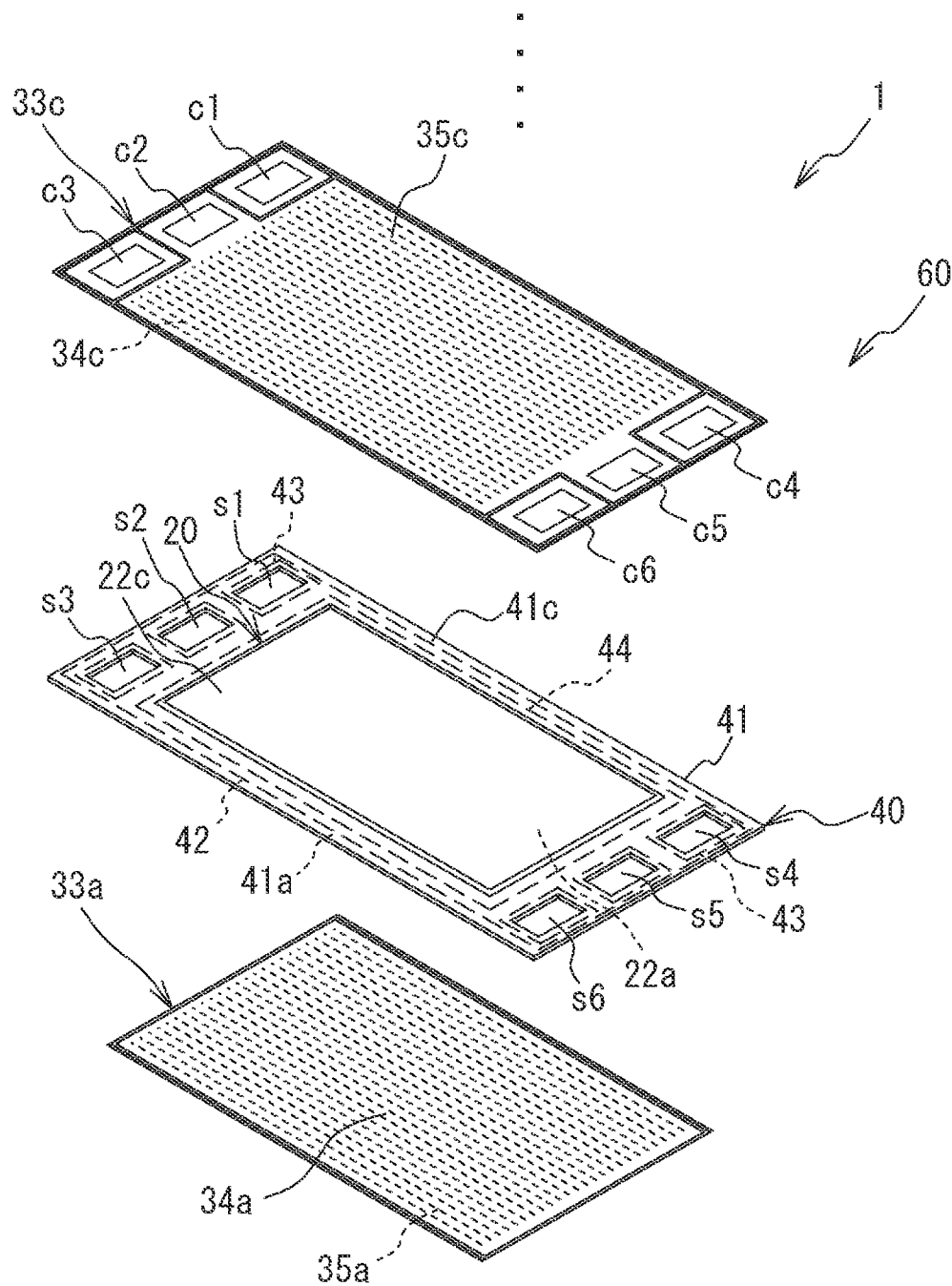
FIG. 1 is an exploded perspective view of each single cell of a fuel cell.

FIG. 1 is an exploded perspective view of each single cell 60 of a fuel cell 1. The fuel cell 1 is formed of a plurality of the single cells 60 stacked on top of each other. The fuel cell 1 is a polymer electrolyte fuel cell that generates electric power upon reception of a supply of fuel gas (for example, hydrogen) and oxidant gas (for example, oxygen) as reactant gases. Each single cell 60 includes a membrane electrode gas diffusion layer assembly 20 (hereinafter, referred to as MEGA), a support frame 40, a cathode separator 33c (hereinafter, referred to as first separator) and an anode separator 33a (hereinafter, referred to as second separator). The support frame 40 supports the MEGA 20. The first separator 33c and the second separator 33a sandwich the MEGA 20. The MEGA 20 includes an anode gas diffusion layer 22a and a cathode gas diffusion layer 22c (hereinafter, referred to as diffusion layers). The support frame 40 has a substantially frame shape. The inner peripheral side of the support frame 40 is bonded to the peripheral region of the MEGA 20. The support frame 40 will be described in detail layer.

The first separator 33c has holes c1 to c3 at one of two short sides thereof, and has holes c4 to c6 at the other one of the two short sides. Similarly, the support frame 40 has holes s1 to s3 at one of two short sides thereof, and has holes s4 to s6 at the other one of the two short sides. The second separator 33a has no such holes. The second separator 33a is smaller in outer peripheral shape than any of the first separator 33c and the support frame 40, and is set back from the holes c1 to c6 and the holes s1 to s6. The holes s1, c1 communicate with each other, and define a cathode inlet manifold. Similarly, the holes s2, c2 define a refrigerant inlet manifold. The holes s3, c3 define an anode outlet manifold. The holes s4, c4 define an anode inlet manifold. The holes s5, c5 define a refrigerant outlet manifold. The holes s6, c6 define a cathode outlet manifold. Each of the holes s1 to s6 of the support frame 40 is an example of a hole through which reactant gas or refrigerant flows. Each of the holes c1 to c6 of the first separator 33c is an example of a communication hole that communicates with a corresponding one of the holes s1 to s6 of the support frame 40.

An anode channel 34a is formed on the face of the second separator 33a, facing the MEGA 20. The anode channel 34a connects the anode inlet manifold with the anode outlet manifold. Fuel gas flows through the anode channel 34a. A cathode channel 34c is formed on the face of the first separator 33c, facing the MEGA 20. The cathode channel 34c connects the cathode inlet manifold with the cathode outlet manifold. Oxidant gas flows through the cathode channel 34c. A refrigerant channel 35a is formed on the face of the second separator 33a across from the face on which the anode channel 34a is formed. A refrigerant channel 35c is formed on the face of the first separator 33c across from the face on which the cathode channel 34c is formed. The refrigerant channels 35a, 35c connect the refrigerant inlet manifold with the refrigerant outlet manifold. Refrigerant flows through the refrigerant channels 35a, 35c. The anode channel 34a, the cathode channel 34c and the refrigerant channels 35a, 35c communicate with the manifolds via grooves and holes (not shown) provided in the support frame 40, the first separator 33c and the second separator 33a.

The support frame 40 has a thin plate shape. The support frame 40 includes a frame-shaped base 41 and protrusions 42, 43, 44. The protrusions 42, 43, 44 are formed on the base 41. The protrusions 42, 43, 44 are formed on one face 41a of the base 41, facing the second separator 33a. No protrusions are formed on the other face 41c facing the first separator 33c. The base 41 is made of a resin having an electrical insulating property and an ultraviolet permeability. Alternatively, the base 41 may be made of a rubber having an electrical insulating property and an ultraviolet permeability. The base 41 is desirably colorless and transparent in consideration of ultraviolet permeability. The material of the base 41 is, for example, engineering plastics, such as a polyethylene naphthalate resin (PEN), a polyethylene terephthalate resin (PET), a polyether sulphone resin (PES) and a polyphenylene sulfide resin (PPS), or commodity plastics, such as a polypropylene resin (PP). The material of the base 41 includes at least one of these resins. The face 41a of the base 41 is an example of a first face. The face 41c of the base 41 is an example of a second face.

The protrusion 42 has a frame shape. The protrusion 42 is provided along the outer periphery of the support frame 40. The protrusions 43 are respectively provided around the holes s1 to s6. Each of the protrusions 43 has a frame shape, and surrounds a corresponding one of the holes s1 to s6. The protrusion 44 has a frame shape, and surrounds the MEGA 20. The base 41 is made of a resin. Each of the protrusions 42 to 44 is made of an elastic rubber, and is, for example, an EPDM rubber or a fluororubber. Alternatively, each of the protrusions 42 to 44 may be made of an elastic resin, such as a thermoplastic elastomer. The base 41 and at least one of the protrusions 42 to 44 may be integrally formed of the same material or may be separately formed of the same material and bonded to each other. Alternatively, the base 41 and at least one of the protrusions 42 to 44 may be integrally formed of different materials or may be separately formed of different materials and bonded to each other.

Figure 2:
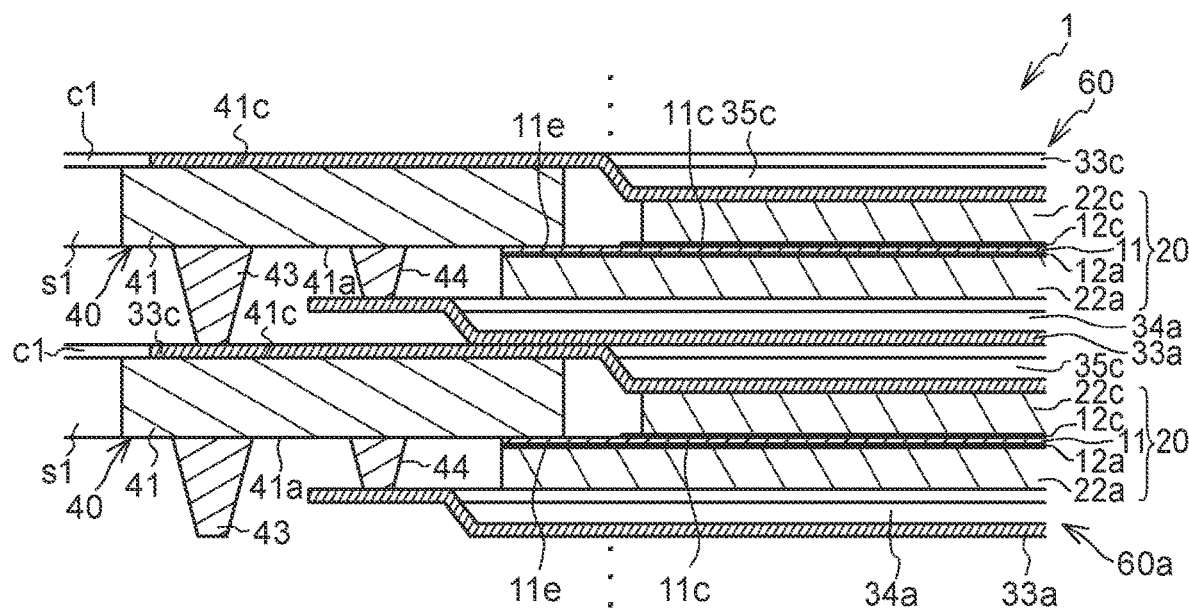
FIG. 2 is a partially sectional view of the fuel cell in which the plurality of single cells are stacked.

FIG. 2 is a partially sectional view of the fuel cell 1 in which the plurality of single cells 60, 60a, . . . are stacked on top of each other. In FIG. 2, only the two single cells 60, 60a are shown, and the other single cells are not shown. The single cell 60a is adjacent to the single cell 60 on the second separator 33a side, that is, the anode side. Hereinafter, the single cell 60 will be described.

The MEGA 20 includes the above-described diffusion layers 22a, 22c, a substantially rectangular electrolyte membrane 11, a cathode catalyst layer 12c and an anode catalyst layer 12a (hereinafter, referred to as catalyst layers). The cathode catalyst layer 12c is formed on one face (the upper face in FIG. 2) of the electrolyte membrane 11. The anode catalyst layer 12a is formed on the other face (the lower face in FIG. 2) of the electrolyte membrane 11. The electrolyte membrane 11 is a polymer electrolyte membrane that exhibits high proton conductivity in a wet state, and is, for example, a fluorine-based ion exchange membrane. The electrolyte membrane 11 has a peripheral region 11e and a center region 11c. The center region 11c is surrounded by the peripheral region 11e.

The catalyst layer 12a is formed such that the end of the catalyst layer 12a is substantially aligned with the end of the electrolyte membrane 11. That is, the catalyst layer 12a is formed substantially all over one face of the electrolyte membrane 11, including the peripheral region 11e and center region 11c of the electrolyte membrane 11. The catalyst layer 12c is formed in the center region 11c on the other face of the electrolyte membrane 11, and is not formed in the peripheral region 11e. The catalyst layer 12a is an example of a first catalyst layer. The catalyst layer 12c is an example of a second catalyst layer. Each of the catalyst layers 12a, 12c is, for example, formed by applying a carbon carrier and an ionomer to the electrolyte membrane 11. Platinum (Pt), or the like, is supported on the carbon carrier. The ionomer has a proton conductivity.

The diffusion layers 22a, 22c are respectively bonded to the catalyst layers 12a, 12c. Each of the diffusion layers 22a, 22c is formed of a material having a gas permeability and an electrical conductivity. For example, each of the diffusion layers 22a, 22c is formed of a porous fiber matrix, such as carbon fiber and graphite fiber. At least one of the diffusion layers 22a, 22c is not limited to the above configuration. At least one of the diffusion layers 22a, 22c may be, for example, a metal porous body having an expanded portion formed by lancing. At least one of the diffusion layers 22a, 22c may be formed of a combination of a porous fiber matrix and a metal porous body bonded to each other. The diffusion layer 22c is provided such that the end of the diffusion layer 22c is located on the slightly inner side of or substantially aligned with the end of the catalyst layer 12c. Therefore, the first diffusion layer 22c is provided such that the diffusion layer 22c overlaps the center region 11c of the electrolyte membrane 11 via the catalyst layer 12c but does not overlap the peripheral region 11e. Thus, the diffusion layer 22c is provided such that the peripheral region 11e of the electrolyte membrane 11 is exposed.

Although the diffusion layer 22a is similarly provided such that the end of the diffusion layer 22a is substantially aligned with the end of the catalyst layer 12a, the catalyst layer 12a is formed substantially all over one face of the electrolyte membrane 11 as described above. For this reason, the diffusion layer 22a is provided such that the diffusion layer 22a not only overlaps the center region 11c via the catalyst layer 12a but also overlaps the peripheral region 11e. In this way, since the diffusion layer 22a is provided such that the diffusion layer 22a also overlaps the peripheral region 11e, the electrolyte membrane 11 and the catalyst layers 12a, 12c are stably supported.

The support frame 40 is larger in outer peripheral shape than the whole MEGA 20, but the support frame 40 is smaller in inner peripheral shape than any of the electrolyte membrane 11, the catalyst layer 12a and the diffusion layer 22a, and is larger in inner peripheral shape than any of the catalyst layer 12c and the diffusion layer 22c. The inner peripheral side of the face 41a of the base 41 of the support frame 40 is bonded to the peripheral region 11e of the electrolyte membrane 11 by an ultraviolet curable adhesive (hereinafter, referred to as UV adhesive) (described later). The first separator 33c is bonded to the face 41c of the base 41 by an UV adhesive (described later). The protrusion 44 is in contact with the second separator 33a, and is compressed. Each protrusion 43 is in contact with the first separator 33c of the adjacent single cell 60a and is compressed. One of the protrusions 43 surrounds not only the holes c1, s1 of the single cell 60 but also the holes c1, s1 of the adjacent single cell 60a. Although not shown in FIG. 2, each protrusion 43 of the single cell 60a is also in contact with a first separator of another adjacent single cell and is compressed. The protrusion 42 not shown in FIG. 2 is also in contact with the first separator 33c of the adjacent single cell 60a and is compressed. Each protrusion 43 is an example of an elastic first protrusion that surrounds the hole s1, and the like, on the face 41a of the base 41. The protrusion 44 is an example of an elastic second protrusion that surrounds the MEGA 20 on the face 41a of the base 41.

In this way, the support frame 40 of the single cell 60 is sandwiched by the first separator 33c, the second separator 33a and the first separator 33c of the adjacent single cell 60a. The second separator 33a is not bonded to the protrusion 44 of the support frame 40 or the diffusion layer 22a, but the second separator 33a is sandwiched by the protrusion 44, the diffusion layer 22a and the first separator 33c of the adjacent single cell 60a. In the fuel cell 1, a plurality of the thus configured single cells 60, 60a, . . . are stacked on top of each other. Although not shown in the drawing, the whole of the plurality of stacked single cells is sandwiched by a pair of terminal plates. In addition, the whole of the plurality of single cells, including the pair of terminal plates, is sandwiched by a pair of electrical insulating plates. Furthermore, the whole of the plurality of single cells, including the electrical insulating plates, is sandwiched by the pair of end plates.

Figure 3:
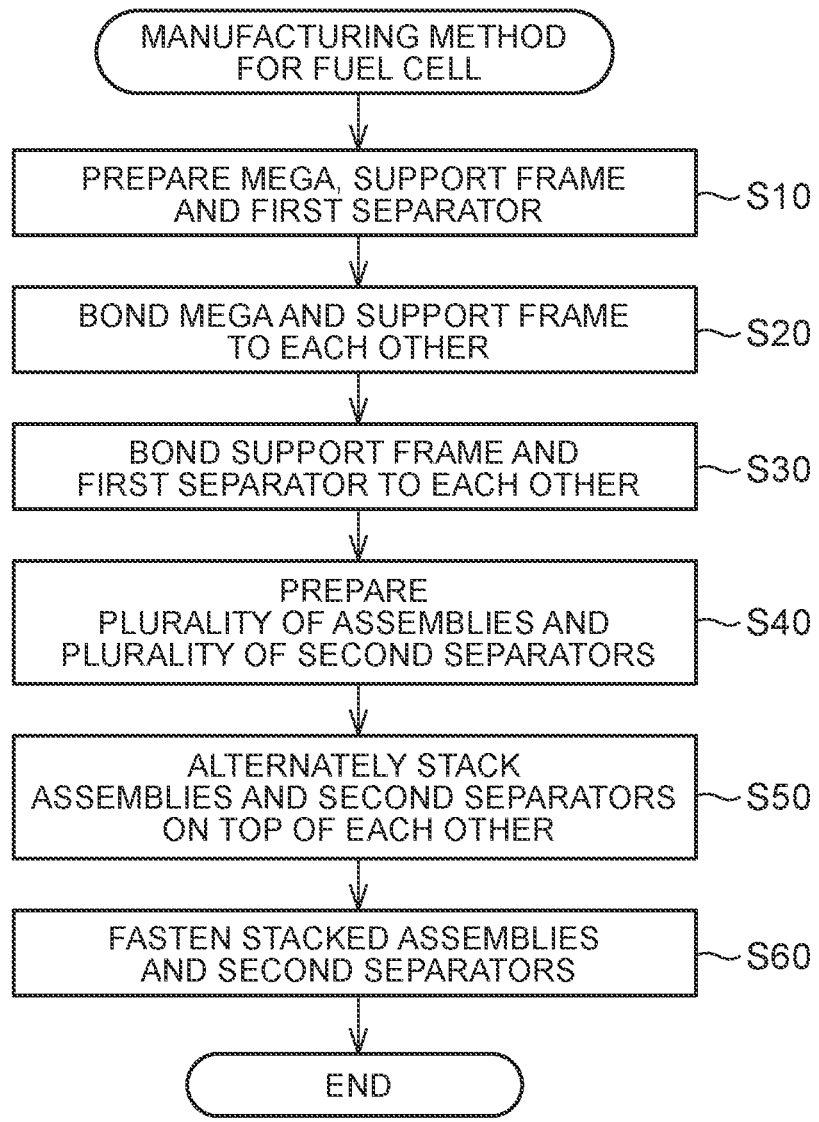
FIG. 3 is a flowchart that shows a manufacturing method for the fuel cell.
Figure 4A:
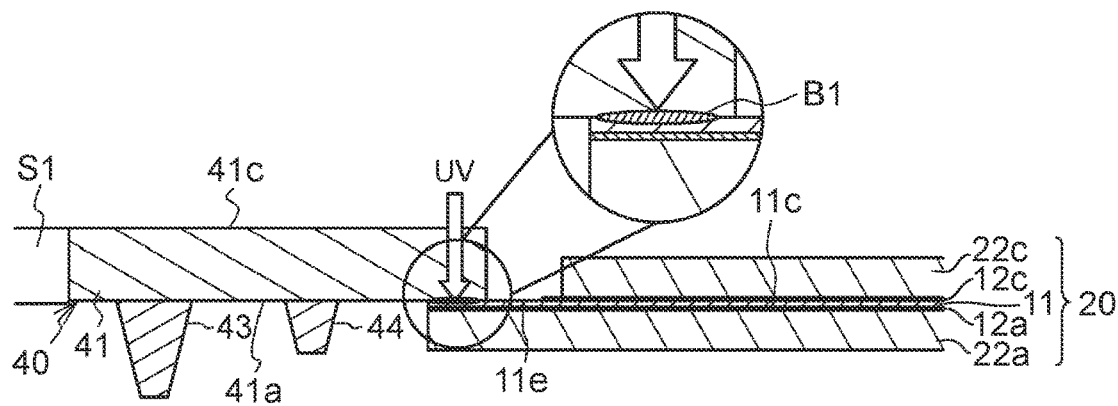
FIG. 4A is a view that illustrates the manufacturing method for the fuel cell.
Figure 4B:
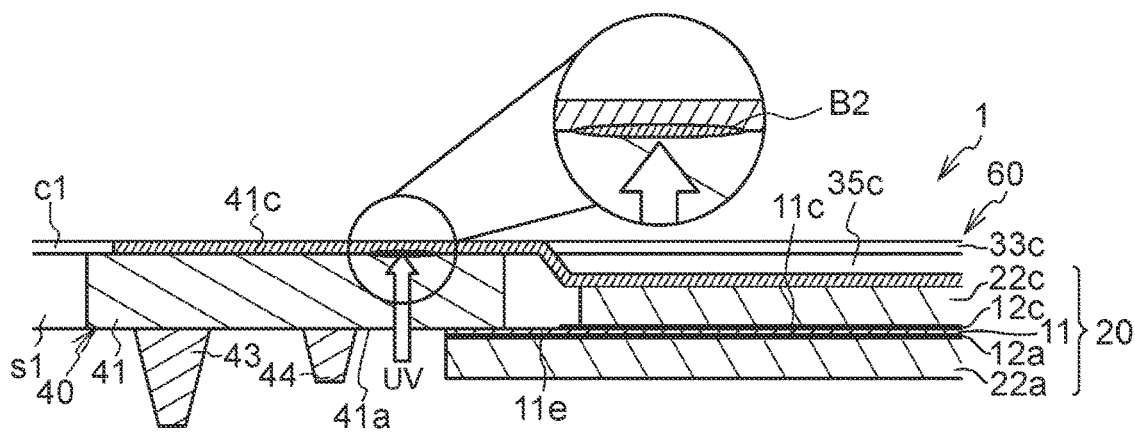
FIG. 4B is a view that illustrates the manufacturing method for the fuel cell.
Figure 4C:
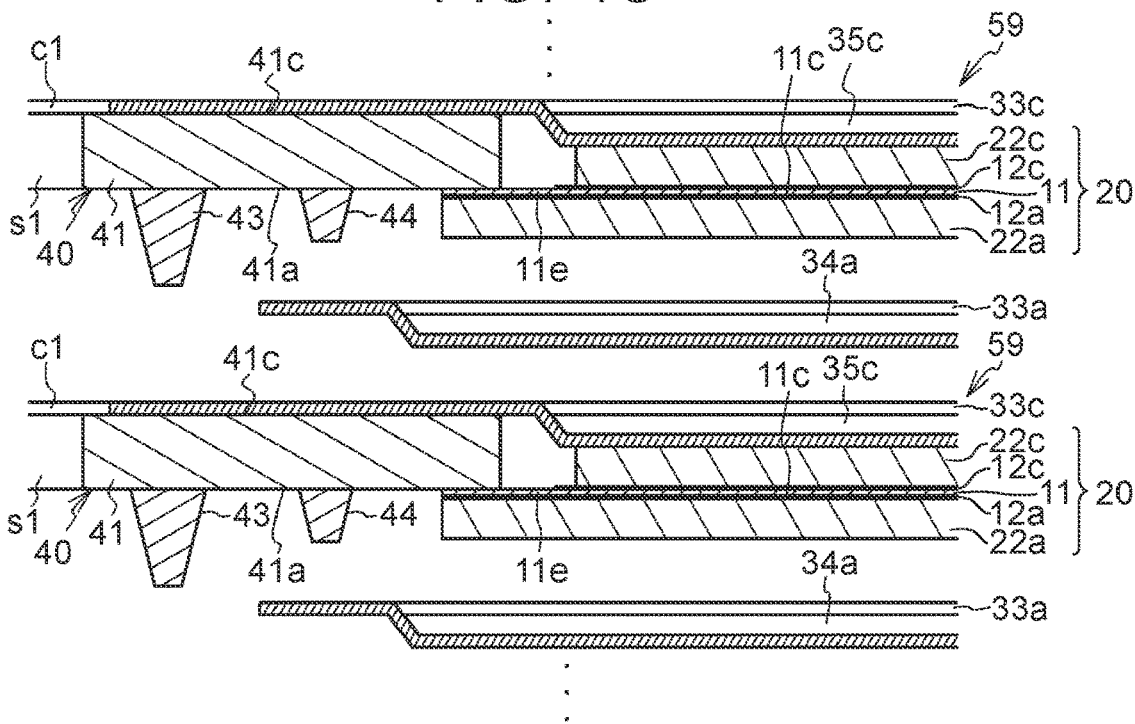
FIG. 4C is a view that illustrates the manufacturing method for the fuel cell.

Next, a manufacturing method for the fuel cell 1 will be described. FIG. 3 is a flowchart that shows the manufacturing method for the fuel cell 1. FIG. 4A to FIG. 4C are views that illustrate the manufacturing method for the fuel cell 1. Initially, the MEGA 20, the support frame 40 and the first separator 33c are prepared (step S10).

Subsequently, the MEGA 20 and the support frame 40 are bonded to each other (step S20). Specifically, as shown in FIG. 4A, a UV adhesive B1 is applied to the peripheral region 11e of the electrolyte membrane 11 or the inner peripheral side of the face 41a of the base 41 of the support frame 40, after that, the peripheral region 11e and the inner peripheral side of the face 41a are brought into contact with each other via the UV adhesive B1, and then ultraviolet light UV is irradiated from the face 41c of the base 41 to the UV adhesive B1. As described above, since the base 41 has an ultraviolet permeability, it is possible to cure the UV adhesive B1 by irradiating ultraviolet light to the UV adhesive B1 via the base 41. Thus, the electrolyte membrane 11 and the support frame 40 are bonded to each other. Since the face of the electrolyte membrane 11 across from the peripheral region 11e is supported by the diffusion layer 22a, the electrolyte membrane 11 is stably supported during bonding, and workability of bonding is ensured.

Subsequently, the support frame 40 and the first separator 33c are bonded to each other (step S30). Specifically, as shown in FIG. 4B, a UV adhesive B2 is applied to the face 41c of the base 41 of the support frame 40 or the flat portion of the face of the first separator 33c, on which the cathode channel 34c is formed, after that, the face 41c of the base 41 and the first separator 33c are brought into contact with each other via the UV adhesive B2, and then ultraviolet light UV is irradiated toward the UV adhesive B2 from the face 41a of the base 41, exposed outside of the outer periphery of the MEGA 20. Thus, the support frame 40 and the first separator 33c are bonded to each other. The region to which the UV adhesive B2 is applied and ultraviolet light UV is irradiated is desirably a region around the refrigerant inlet manifold, a region around the refrigerant outlet manifold, a region around the anode inlet manifold, a region around the anode outlet manifold and a region near the outer periphery of the support frame 40 and first separator 33c. Since the MEGA 20 is not able to permeate ultraviolet light UV, ultraviolet light UV needs to be irradiated toward the UV adhesive B2 through a portion outside of the outer periphery of the MEGA 20. For this reason, the region to which the UV adhesive B2 is applied needs to be at least the region of the face 41c of the base 41, located outside the MEGA 20, or the flat portion of the first separator 33c. In this way, an assembly 59 in which the MEGA 20 and the first separator 33c are bonded to the support frame 40 is manufactured.

The state of each of the UV adhesive B1 and the UV adhesive B2 before application may be, for example, any one of a gel state, a jelly state and a creamy state. The UV adhesive B1 and the UV adhesive B2 may be applied by, for example, a method using a dispenser or screen printing. Each of the UV adhesive B1 and the UV adhesive B2 may be the one using a radical polymerization resin, and, more specifically, may be an ultraviolet curable polyisobutylene resin, an ultraviolet curable epoxy resin, an ultraviolet curable acrylic resin, or the like.

As described above, a plurality of the assemblies 59, in which the MEGA 20 and the first separator 33c are bonded to the support frame 40, and a plurality of the second separators 33a are prepared (step S40). The plurality of assemblies 59 are prepared by repeating the above-described step S10 to step S30. Subsequently, as shown in FIG. 4C, the plurality of assemblies 59 and the plurality of second separators 33a are alternately stacked on top of each other (step S50). Specifically, the plurality of assemblies 59 and the plurality of second separators 33a are stacked as follows. The protrusion 44 of the support frame 40 is in contact with the adjacent second separator 33a and is compressed. The second separator 33a is sandwiched by the diffusion layer 22a and the first separator 33c of the adjacent assembly 59. The protrusions 43 of the support frame 40 are not in contact with the second separator 33a but are in contact with the first separator 33c of the adjacent assembly 59 that protrudes from the outer periphery of the second separator 33a and are compressed. Although not shown in the drawing, the protrusion 42 is also in contact with the adjacent first separator 33c and is compressed. The above-described terminal plate, electrical insulating plate and end plate are stacked on top of each other at each end of the whole of these stacked plurality of assemblies 59 and plurality of second separators 33a.

These members are fastened in a stacked state in this way (step S60). Specifically, in a state where a predetermined load is applied to these members in the stacking direction, the end plates are fastened to each other by bolts, or the like. Thus, the protrusions 42, 43, 44 are kept compressed, and sealing performance for oxidant gas, fuel gas and refrigerant are ensured by the elastic restoring force of these protrusions 42, 43, 44.

As described above, since the base 41 of the support frame 40 has an ultraviolet permeability, it is possible to easily irradiate ultraviolet light to the UV adhesive B1 and the UV adhesive B2 by allowing ultraviolet light to pass through the base 41 of the support frame 40. After the MEGA 20 and the support frame 40 are bonded to each other, and before the second separator 33a is arranged to the face 41a of the base 41 of the support frame 40, ultraviolet light is irradiated to the UV adhesive B2 from the face 41a of the base 41, exposed from the MEGA 20. Thus, it is possible to easily bond the support frame 40 and the first separator 33c to each other without interference of the second separator 33a.

As described above, the MEGA 20 and the first separator 33c are bonded to the support frame 40 by the UV adhesive B1 and the UV adhesive B2. For this reason, for example, in comparison with the case where a thermoplastic adhesive is used instead of the UV adhesive B1 or the UV adhesive B2, a time that is required from the start of irradiation of ultraviolet light to the UV adhesive B1 or the UV adhesive B2 until the UV adhesive B1 or the UV adhesive B2 is cured is short in the present embodiment. Therefore, an extension of manufacturing time is suppressed. When a thermoplastic adhesive is used, not only the thermoplastic adhesive but also peripheral members need to be heated, so an energy loss can increase; whereas, in the present embodiment, such an energy loss is small. Therefore, an increase in manufacturing cost is also suppressed.

Since the first separator 33c is bonded to the support frame 40, a misalignment of the first separator 33c with respect to the support frame 40 is suppressed in the processes of step S50 and step S60.

In the manufacturing method according to the present embodiment, it is conceivable to change the order of step S20 and step S30. However, as described above, the first separator 33c is larger in outer peripheral shape than the MEGA 20. For this reason, if the first separator 33c is bonded to the base 41 of the support frame 40 in advance of the MEGA 20, the face 41c of the base 41 is covered with the first separator 33c thereafter, so it is not possible to irradiate ultraviolet light from the face 41c of the base 41 to the UV adhesive B2. Therefore, the MEGA 20 having a smaller outer peripheral shape is bonded to the face 41a of the base 41 first and then the first separator 33c having a larger outer peripheral shape is bonded to the face 41c of the base 41. Thus, it is possible to bond both the MEGA 20 and the first separator 33c to the support frame 40 by using a UV adhesive.

In the above-described embodiment, as shown in FIG. 4B, ultraviolet light is irradiated toward the UV adhesive B2 through a portion between the protrusion 44 and the diffusion layer 22a; however, the region to which the UV adhesive B2 is applied or the region to which ultraviolet light is irradiated is not limited to this configuration. For example, the UV adhesive B2 may also be applied to a region above the protrusion 44 and the protrusions 43, and then ultraviolet light may be irradiated through a portion between each protrusion 43 and the protrusion 44. Alternatively, when each protrusion 43 or the protrusion 44 is made of, for example, a rubber having an ultraviolet permeability, ultraviolet light may be irradiated by allowing ultraviolet light to pass through each protrusion 43 or the protrusion 44.

Figure 5:
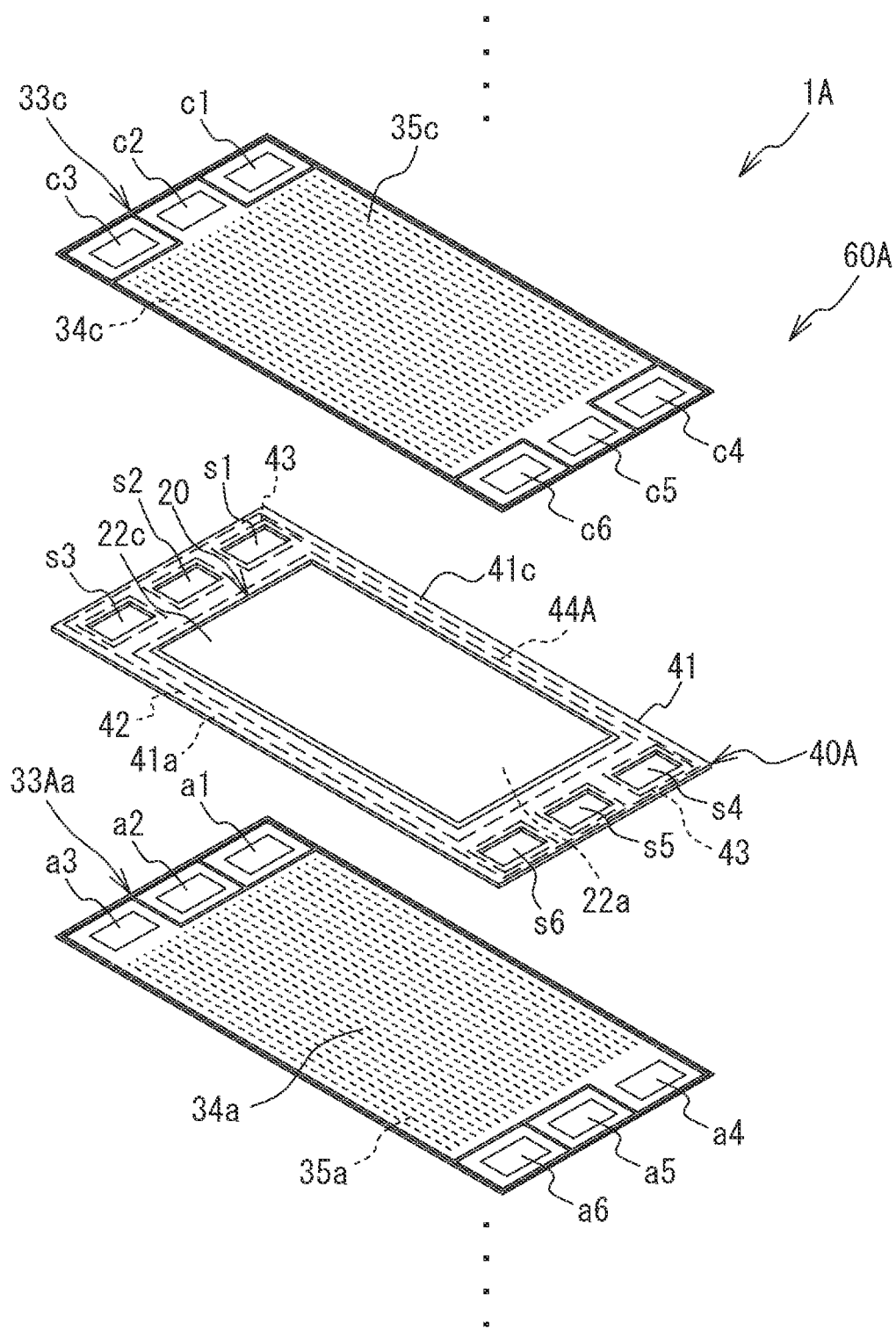
FIG. 5 is an exploded perspective view of each single cell of a fuel cell according to an alternative embodiment.

Next, a fuel cell 1A according to an alternative embodiment will be described. FIG. 5 is an exploded perspective view of each single cell 60A of the fuel cell 1A according to the alternative embodiment. In the alternative embodiment, like reference numerals denote the same components as those of the above-described embodiment, and the overlap description is omitted. A second separator 33Aa has a larger outer periphery than the above-described second separator 33a. The second separator 33Aa is substantially the same size in outer peripheral shape as a support frame 40A or the first separator 33c. The support frame 40A has substantially the same size and the same shape as the above-described support frame 40. The second separator 33Aa has holes a1 to a6 at positions corresponding to the holes s1 to s6. The holes a1, s1, c1 communicate with one another to define a cathode inlet manifold. The holes a2, s2, c2 define a refrigerant inlet manifold. The holes a3, s3, c3 define an anode outlet manifold. The holes a4, s4, c4 define an anode inlet manifold. The holes a5, s5, c5 define a refrigerant outlet manifold. The holes a6, s6, c6 define a cathode outlet manifold.

Figure 6:
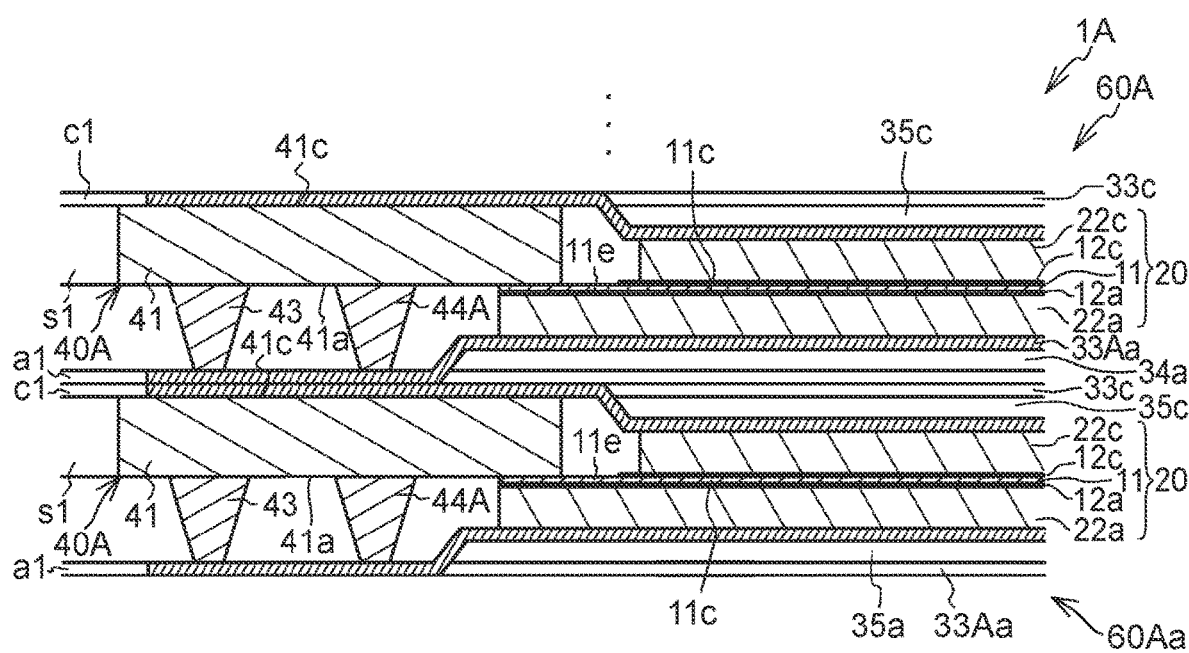
FIG. 6 is a partially sectional view of the fuel cell in which the plurality of single cells are stacked according to the alternative embodiment.

FIG. 6 is a partially sectional view of the fuel cell 1A in which a plurality of the single cells 60A, 60Aa, . . . according to the alternative embodiment are stacked on top of each other. In FIG. 6, each of the single cells 60A, 60Aa has the first separator 33c and the second separator 33Aa that sandwich the support frame 40A. The second separator 33Aa is in contact with the protrusions 43, 44A such that the protrusions 43, 44A are compressed. The protrusion 44A has substantially the same height as each of the protrusions 43.

Figure 7:
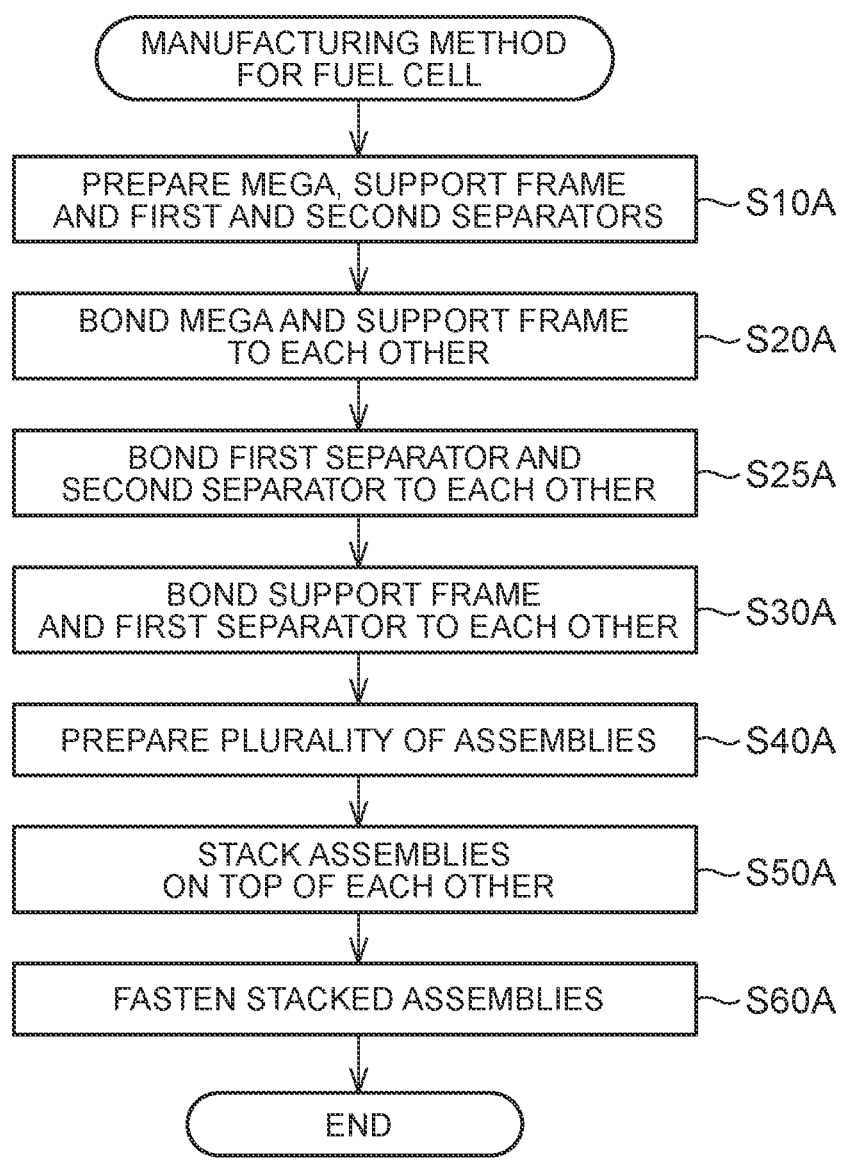
FIG. 7 is a flowchart that shows a manufacturing method for the fuel cell according to the alternative embodiment.

Subsequently, a manufacturing method for the fuel cell 1A according to the alternative embodiment will be described. FIG. 7 is a flowchart that shows the manufacturing method for the fuel cell 1A according to the alternative embodiment. FIG. 8A to FIG. 8D are views that illustrate the manufacturing method for the fuel cell 1A according to the alternative embodiment. Initially, the MEGA 20, the support frame 40A, the first separator 33c and the second separator 33Aa are prepared (step S10A). Subsequently, as shown in FIG. 8A, as in the case of the above-described embodiment, the MEGA 20 and the support frame 40A are bonded to each other by using the UV adhesive B1 (step S20A).

Subsequently, the first separator 33c and the second separator 33Aa are bonded to each other by welding with the use of laser LB (step S25A). Specifically, as shown in FIG. 8B, the refrigerant channel 35c of the first separator 33c and the refrigerant channel 35a of the second separator 33Aa are opposed and bonded to each other. The refrigerant channels 35c, 35a both extend in the same direction in a recessed shape. Therefore, as shown in FIG. 8B, portions that are welded with the use of laser LB are not the portions in the refrigerant channels 35c, 35a but flat portions at which the first separator 33c and the second separator 33Aa contact each other, portions around the refrigerant channels 35c, 35a and portions around the manifolds. The first separator 33c and the second separator 33Aa may be bonded to each other at an outer periphery that surrounds the refrigerant channels 35c, 35a, the refrigerant inlet manifold and the refrigerant outlet manifold.

Subsequently, as shown in FIG. 8C, the support frame 40A and the first separator 33c to which the second separator 33Aa is bonded are bonded to each other by the UV adhesive B2 as in the case of the above-described embodiment (step S30A). In this way, an assembly 59A in which the MEGA 20, the first separator 33c and the second separator 33Aa are bonded to the support frame 40A is manufactured.

Subsequently, the plurality of assemblies 59A are prepared by repeating the above-described step S10A to step S30A (step S40A). Subsequently, as shown in FIG. 8D, these assemblies 59A are arranged such that the orientations of the assemblies 59A coincide with each other, and are stacked on top of each other (step S50A). Specifically, the assemblies 59A are stacked such that the protrusions 43, 44A are in contact with the second separator 33Aa of the adjacent assembly 59A and are compressed. Subsequently, as in the case of the above-described embodiment, the plurality of stacked assemblies 59A are fastened together with a pair of terminal plates, a pair of electrical insulating plates and a pair of end plates (step S60A).

As described above, after the second separator 33Aa is bonded to the first separator 33c, ultraviolet light UV is irradiated from the face 41a of the base 41 of the support frame 40A to the UV adhesive B2. For this reason, it is possible to easily bond the support frame 40A and the first separator 33c to each other without interference of the second separator 33Aa. Since the first separator 33c and the second separator 33Aa are bonded to each other by welding, a misalignment between the first separator 33c and the second separator 33Aa in, for example, the processes of step S50A and step S60A is prevented.

In the present alternative embodiment as well, since the MEGA 20 and the first separator 33c are bonded to the support frame 40A by the UV adhesive B1 and the UV adhesive B2, respectively, an extension of manufacturing time and an increase in manufacturing cost are suppressed.

The order of step S20A and step S25A does not matter, but step S30 needs to be executed after step S20A and step S25A are executed. This is because, as described above, if the first separator 33c to which the second separator 33Aa is bonded is bonded to the support frame 40A in advance of the MEGA 20, it is not possible to irradiate ultraviolet light to the UV adhesive B1 that bonds the MEGA 20 thereafter and, as a result, it is not possible to bond the MEGA 20 to the support frame 40A.

Figure 10A:
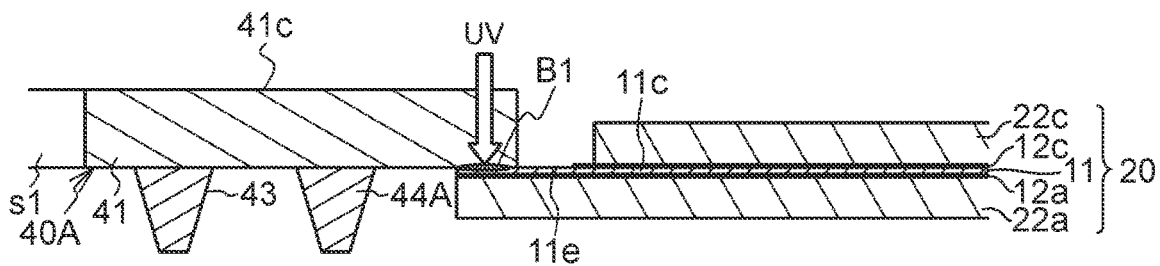
FIG. 10A is a view that illustrates the manufacturing method according to the alternative embodiment for a fuel cell.
Figure 10B:
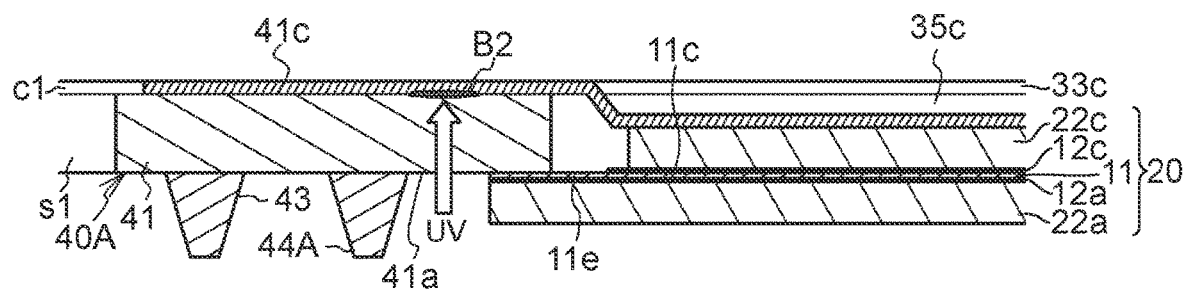
FIG. 10B is a view that illustrates the manufacturing method according to the alternative embodiment for a fuel cell.
Figure 10C:
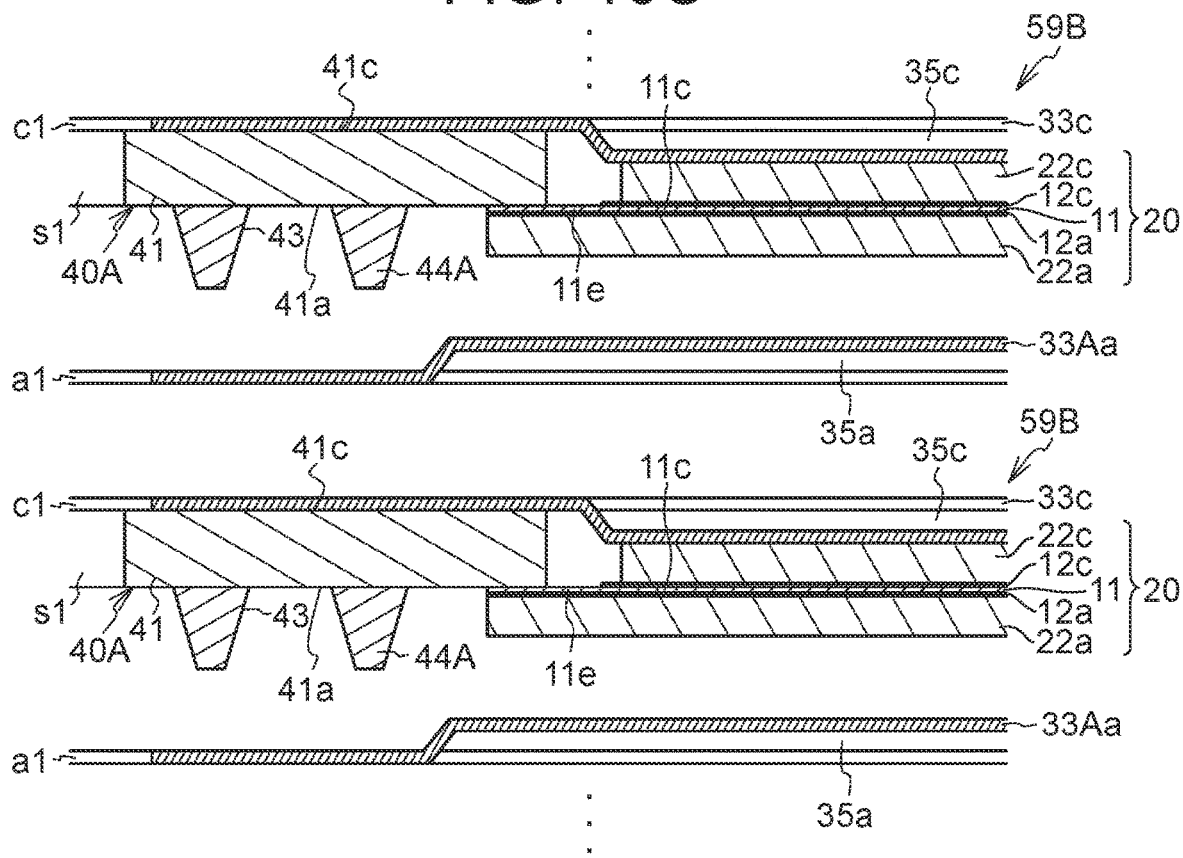
FIG. 10C is a view that illustrates the manufacturing method according to the alternative embodiment for a fuel cell.

Next, a manufacturing method according to an alternative embodiment for the fuel cell 1A will be described. FIG. 9 is a flowchart that shows the manufacturing method according to the alternative embodiment for the fuel cell 1A. FIG. 10A to FIG. 10C are views that illustrate the manufacturing method according to the alternative embodiment for the fuel cell 1A. The manufacturing method according to the alternative embodiment for the fuel cell 1A is a method similar to the above-described manufacturing method for the fuel cell 1. Initially, the MEGA 20, the support frame 40A and the first separator 33c are prepared (step S10B). Subsequently, as shown in FIG. 10A, as in the case of the above-described embodiment, the MEGA 20 and the support frame 40A are bonded to each other by the UV adhesive B1 (step S20B). Subsequently, as shown in FIG. 10B, as in the case of the above-described embodiment, the support frame 40A and the first separator 33c are bonded to each other by the UV adhesive B2 (step S30B). Subsequently, a plurality of assemblies 59B, in which the MEGA 20, the support frame 40A and the first separator 33c are bonded to each other, and the plurality of second separators 33Aa are prepared (step S40B). Subsequently, as shown in FIG. 10C, the assemblies 59B and the second separators 33Aa are alternately stacked on top of each other (step S50B). Specifically, the plurality of assemblies 59B and the plurality of second separators 33Aa are stacked such that the protrusions 43, 44A are compressed by the adjacent second separator 33Aa. A gasket (not shown) is arranged between the first separator 33c and the second separator 33Aa. When the gasket is compressed, similar portions to those of the above-described laser welding are sealed. Subsequently, as in the case of the above-described embodiment, the plurality of assemblies 59B and the plurality of second separators 33Aa, stacked on top of each other, are fastened (step S60B).

With the thus configured manufacturing method as well, it is possible to easily bond the support frame 40A and the first separator 33c to each other without interference of the second separator 33Aa. Since the MEGA 20, the support frame 40A and the first separator 33c are bonded to each other by the UV adhesive B1 and the UV adhesive B2, an extension of manufacturing time and an increase in manufacturing cost are suppressed. Since the first separator 33c and the second separator 33Aa do not need to be welded, an extension of manufacturing time and an increase in manufacturing cost are further suppressed.

The embodiments of the disclosure are described in detail above; however, the disclosure is not limited the above-described embodiments. The embodiments may be variously modified or changed within the scope of the disclosure recited in the appended claims.

What is claimed is:

1. A manufacturing method for a fuel cell, the manufacturing method comprising:

preparing a membrane electrode gas diffusion layer assembly in which a catalyst layer and a gas diffusion layer are formed on each face of an electrolyte membrane such that a peripheral region of one of the faces of the electrolyte membrane is exposed;

preparing a frame-shaped support frame having an electrical insulating property and an ultraviolet permeability, the support frame being larger in outer peripheral shape than the electrolyte membrane, the support frame being smaller in inner peripheral shape than the electrolyte membrane;

preparing a first separator that is larger in outer peripheral shape than the membrane electrode gas diffusion layer assembly;

bonding the membrane electrode gas diffusion layer assembly and the support frame to each other by bringing the peripheral region of the electrolyte membrane and an inner peripheral side of a first face of the support frame into contact with each other via a first ultraviolet curable adhesive and then irradiating ultraviolet light to the first ultraviolet curable adhesive from a second face of the support frame across from the first face;

after the membrane electrode gas diffusion layer assembly and the support frame are bonded to each other, bonding the support frame and the first separator to each other by bringing the second face of the support frame and the first separator into contact with each other via a second ultraviolet curable adhesive located outside an outer periphery of the membrane electrode gas diffusion layer assembly and then irradiating ultraviolet light to the second ultraviolet curable adhesive from the first face of the support frame at a portion outside the outer periphery of the membrane electrode gas diffusion layer assembly;

preparing a plurality of assemblies in which the support frame, the membrane electrode gas diffusion layer assembly and the first separator are bonded to each other;

preparing a second separator that is larger in outer peripheral shape than the membrane electrode gas diffusion layer assembly; and alternately stacking the plurality of assemblies and a plurality of the second separators on top of each other such that each second separator is arranged to the first face of the support frame of a corresponding one of the assemblies, wherein the support frame has a plurality of holes, a plurality of first protrusions, and a second protrusion, the first protrusions and the second protrusion are elastic, reactant gas or refrigerant flows through the holes, the first protrusions and the second protrusion are formed on the first face such that one of the first protrusions surrounds one of the holes and the second protrusion surrounds the membrane electrode gas diffusion layer assembly, the first separator has a communication hole that communicates with the hole, the second separator is smaller in outer peripheral shape than the first separator, the second separator has no communication hole that communicates with the hole, and in alternately stacking the plurality of assemblies and the plurality of second separators, the first protrusions of each assembly of the plurality of assemblies are compressed by the first separator of an adjacent assembly that is one of the plurality of assemblies and that is adjacent to the assembly, and the second protrusion is compressed by the second separator.

2. The manufacturing method according to claim 1, wherein
a material of at least one of the first and second protrusions is a thermoplastic elastomer, and the at least one of the first and second protrusions is formed integrally with the support frame.

3. The manufacturing method according to claim 1, wherein the support frame has a hole and elastic first and second protrusions, reactant gas or refrigerant flows through the hole, the first and second protrusions are formed on the first face such that the first protrusion surrounds the hole and the second protrusion surrounds the membrane electrode gas diffusion layer assembly, and in alternately stacking the plurality of assemblies and the plurality of second separators, the first and second protrusions are compressed by the second separator.

4. The manufacturing method according to claim 1, wherein
a material of the support frame includes at least one of a polyethylene naphthalate resin, a polyethylene terephthalate resin, a polyether sulphone resin, a polyphenylene sulfide resin and a polypropylene resin.

5. A manufacturing method for a fuel cell, the manufacturing method comprising:
preparing a membrane electrode gas diffusion layer assembly in which a catalyst layer and a gas diffusion layer are formed on each face of an electrolyte membrane such that a peripheral region of one of the faces of the electrolyte membrane is exposed;

preparing a frame-shaped support frame having an electrical insulating property and an ultraviolet permeability, the support frame being larger in outer peripheral shape than the electrolyte membrane, the support frame being smaller in inner peripheral shape than the electrolyte membrane;

preparing first and second separators that are larger in outer peripheral shape than the membrane electrode gas diffusion layer assembly;

bonding the membrane electrode gas diffusion layer assembly and the support frame to each other by bringing the peripheral region of the electrolyte membrane and an inner peripheral side of a first face of the support frame into contact with each other via a first ultraviolet curable adhesive and then irradiating ultraviolet light to the first ultraviolet curable adhesive from a second face of the support frame across from the first face;

bonding the first and second separators to each other by welding;

after the membrane electrode gas diffusion layer assembly and the support frame are bonded to each other and after the first and second separators are bonded to each other, bonding the support frame and the first separator to each other by bringing the second face of the support frame and the first separator into contact with each other via a second ultraviolet curable adhesive located outside an outer periphery of the membrane electrode gas diffusion layer assembly and then irradiating ultraviolet light to the second ultraviolet curable adhesive from the first face of the support frame at a portion outside the outer periphery of the membrane electrode gas diffusion layer assembly;

preparing a plurality of assemblies in which the support frame, the membrane electrode gas diffusion layer assembly and the first and second separators are bonded to each other; and stacking the plurality of assemblies on top of each other in the same orientation, wherein the support frame has a plurality of holes, a plurality of first protrusions, and a second protrusion, the first protrusions and the second protrusion are elastic, reactant gas or refrigerant flows through the holes, the first protrusions and the second protrusion are formed on the first face such that one of the first protrusions surrounds one of the holes and the second protrusion surrounds the membrane electrode gas diffusion layer assembly, the first separator has a communication hole that communicates with the hole, the second separator has a communication hole that communicates with the hole, and in stacking the plurality of assemblies, the first protrusions, and the second protrusion are compressed by the second separator of an adjacent assembly that is one of the plurality of assemblies.

6. The manufacturing method according to claim 5, wherein
a material of at least one of the first and second protrusions is a thermoplastic elastomer, and the at least one of the first and second protrusions is formed integrally with the support frame.

7. The manufacturing method according to claim 5, wherein
a material of the support frame includes at least one of a polyethylene naphthalate resin, a polyethylene terephthalate resin, a polyether sulphone resin, a polyphenylene sulfide resin and a polypropylene resin.

8. A manufacturing method for a fuel cell, the manufacturing method comprising:
preparing a membrane electrode gas diffusion layer assembly in which a catalyst layer and a gas diffusion layer are formed on each face of an electrolyte membrane such that a peripheral region of one of the faces of the electrolyte membrane is exposed;
preparing a frame-shaped support frame having an electrical insulating property and an ultraviolet permeability, the support frame being larger in outer peripheral shape than the electrolyte membrane, the support frame being smaller in inner peripheral shape than the electrolyte membrane;
preparing a second separator that is larger in outer peripheral shape than the membrane electrode gas diffusion layer assembly;
preparing a first separator that is larger in outer peripheral shape than the membrane electrode gas diffusion layer assembly;
bonding the membrane electrode gas diffusion layer assembly and the support frame to each other by bringing the peripheral region of the electrolyte membrane and an inner peripheral side of a first face of the support frame into contact with each other via a first ultraviolet curable adhesive and then irradiating ultraviolet light to the first ultraviolet curable adhesive from a second face of the support frame across from the first face;
after the membrane electrode gas diffusion layer assembly and the support frame are bonded to each other, bonding the support frame and the first separator to each other by bringing the second face of the support frame and the first separator into contact with each other via a second ultraviolet curable adhesive located outside an outer periphery of the membrane electrode gas diffusion layer assembly and then irradiating ultraviolet light to the second ultraviolet curable adhesive from the first face of the support frame at a portion outside the outer periphery of the membrane electrode gas diffusion layer assembly;
preparing a plurality of assemblies in which the support frame, the membrane electrode gas diffusion layer assembly and the first separator are bonded to each other; and
stacking the plurality of assemblies on top of each other in the same orientation,
wherein the support frame has a plurality of holes, a plurality of first protrusions, and a second protrusion, the first protrusions and the second protrusion are elastic, reactant gas or refrigerant flows through the holes, the first protrusions and the second protrusion are formed on the first face such that one of the first protrusions surrounds one of the holes and the second protrusion surrounds the membrane electrode gas diffusion layer assembly,
the first separator has a communication hole that communicates with the hole,
the second separator has a communication hole that communicates with the hole, and
in alternately stacking the plurality of assemblies and the plurality of second separators, the first protrusions and the second protrusion are compressed by the adjacent second separator.

\* \* \* \* \*